United States Patent [19]

Ebayashi et al.

[11] Patent Number: 5,354,372
[45] Date of Patent: Oct. 11, 1994

[54] UNDERCOATING COMPOSITION

[75] Inventors: Shigeki Ebayashi; Hiromichi Tomihari; Tsutomu Hattori; Hiroaki Tamura; Toshio Hayashi, all of Kanagawa, Japan

[73] Assignees: Yushiro Chemical Industry Co., Ltd., Tokyo; Nissan Motor Co., Ltd., Kanagawa, both of Japan

[21] Appl. No.: 972,103

[22] Filed: Nov. 5, 1992

Related U.S. Application Data

[63] Continuation-in-part of Ser. No. 908,266, Jul. 2, 1992, abandoned.

[30] Foreign Application Priority Data

Jul. 4, 1991 [JP] Japan ................... 3-190689

[51] Int. Cl.$^5$ ................... C02D 191/06; C02D 191/08
[52] U.S. Cl. ................... 106/271; 106/14.29; 106/14.38
[58] Field of Search ................... 106/271, 14.29, 14.38

[56] References Cited

U.S. PATENT DOCUMENTS

| | | | |
|---|---|---|---|
| 3,565,672 | 2/1971 | Adams | 252/389 |
| 3,746,643 | 7/1973 | Rogers | 106/14.29 |
| 3,816,310 | 6/1974 | Hunt | 252/389 |
| 4,468,254 | 8/1984 | Yokoyama et al. | 106/271 |
| 4,842,903 | 6/1989 | Hayner | 106/14.29 |

FOREIGN PATENT DOCUMENTS

| | | | |
|---|---|---|---|
| 56-112974 | 9/1981 | Japan | 106/14.38 |
| 61-111382 | 5/1986 | Japan . | |
| 63-189475 | 8/1988 | Japan . | |
| 1424108 | 2/1976 | United Kingdom | 106/271 |

*Primary Examiner*—David Brunsman
*Attorney, Agent, or Firm*—Finnegan, Henderson, Farabow, Garrett & Dunner

[57] ABSTRACT

The present invention relates to an undercoating composition and more particularly to an undercoating composition which has good application property and provides a coating film of low density having good resistance to corrosion, chipping, and secondary run. It will be used for automotive floor undercoating. The present invention of an undercoating composition which comprises (a) 100 parts by weight of a wax, (b) 10–200 parts by weight of a basic organic-inorganic dispersion composed of a metal salt of organic sulfonic acid, basic alkaline earth metal salt, and organic solvent, (c) 2–50 parts by weight of an α-olefin oligomer, and (d) 2–50 parts by weight of a metal salt of lanolin fatty acid. And another invention may be a composition in which (e) 1–30 parts by weight of an inorganic powder for 100 parts by weight of the total nonvolatile matter of the composition is added to the above-mentioned composition.

11 Claims, No Drawings

UNDERCOATING COMPOSITION

This application is a continuation-in-part of application Ser. No. 07/908,266, filed Jul. 2, 1992, now abandoned.

BACKGROUND OF THE INVENTION

1. Field of the Invention

The present invention relates to an undercoating composition and more particularly to an undercoating composition which has good application property and provides a coating film of low density having good resistance to corrosion, chipping, and secondary run. It will be used for automotive floor undercoating.

2. Description of the Prior Art

The conventional automotive undercoating is required to have, good rust preventing performance at high temperatures or at low temperatures near the exhaust pipes, and good chipping resistance at low temperatures and good run resistance at high temperatures. There are known some undercoating compositions which satisfy these requirements. They are composed of wax, asphalt, metal sulfonate, and inorganic powder (such as talc and calcium carbonate) which are dispersed in an organic solvent (such as mineral spirit). For example, Japanese Patent Laid open No. 189475/1988 discloses one which is composed of asphalt, metal salt of petroleum sulfonate, metal salt of petrolactum oxide, waxy substance, microcrystalline wax, metal salt of lanolin fatty acid, metal salt of synthetic sulfonic acid, and extender pigment (such as barium sulfate). Japanese Patent Laid-open No. 111382/1986 also discloses one which contains a sulfonate of an ultrabasic alkaline earth metal and petrolactum oxide dispersed in an organic solvent.

The conventional compositions mentioned above do not satisfy all of the requirements—corrosion resistance, chipping resistance, coating property, and resistance to secondary run. In addition, their large content of inorganic powder leads to unsatisfactory corrosion resistance when they are used in the form a thin film as the automotive floor undercoating. They also suffer from a disadvantage of forming a coating film of high density which adds to the weight of the automobile. Another disadvantage is poor atomization due to tailing at the time of spray coating.

SUMMARY OF THE INVENTION

The present invention was completed to address the above mentioned problems. It is an object of the present invention to provide an undercoating composition which has good application property and provides a coating film of low density having good resistance to corrosion, chipping, and secondary run. An another object of the present invention is to provide a composition which undercoats an automotive floor without increase in the weight of the automobile.

After a series of investigations on the relationship between the undercoating composition and the coating film produced therefrom, the present inventors found that an undercoating composition exhibits good application property and gives a coating film of low density having good corrosion resistance, if it contains a basic organic-inorganic dispersion, an α-olefin oligomer, and a metal salt of lanolin fatty acid. Additionally, the inventive composition may contain an inorganic powder. The present invention was completed on the basis of this finding.

The first invention is an undercoating composition which comprises (a) 100 parts by weight of a wax, (b) 10–200 parts by weight of a basic organic-inorganic dispersion composed of a metal salt of organic sulfonic acid, basic alkaline earth metal salt, and organic solvent, (c) 2–50 parts by weight of an α-olefin oligomer, and (d) 2–50 parts by weight of a metal salt of lanolin fatty acid.

The second invention is an undercoating composition which comprises (a) 100 parts by weight of a wax, (b) 10–200 parts by weight of a basic organic-inorganic dispersion composed of a metal salt of organic sulfonic acid, basic alkaline earth metal salt, and organic solvent, (c) 2–30 parts by weight of an α-olefin oligomer, (d) 2–50 parts by weight of a metal salt of lanolin fatty acid, and (e) 1–30 parts by weight of an inorganic powder for 100 parts by weight of the total nonvolatile matter of the composition.

The wax used in the present invention includes natural and synthetic ones, glycerides, and oxides and acid-modified products thereof. Natural waxes include animal or vegetable waxes (such as beef tallow, lard, hydrogenated fats and oils, beeswax, spermaceti, hydrogenated spermaceti, carnaubawax, candelilla wax, Japan wax, and rice bran wax) and mineral waxes (such as paraffin wax, microcrystalline wax, men tan wax, and ceresin wax). Synthetic waxes include polyethylene wax, polypropylene wax, and waxes formed by Fischer-Tropsch process. For example, of these waxes, microcrystalline wax having a melting point of 40°–90° C. is adequate.

The basic organic inorganic-dispersion used in the present invention is an oil-soluble dispersion composed of a metal salt of organic sulfonic acid, basic alkaline earth metal salt, and organic solvent. It is known in the industry, and its production process and composition are disclosed in U.S. Pat. Nos. 3,565,672 and 3,816,310. The metal for the organic sulfonate may be sodium, potassium, magnesium, calcium, or barium, with the latter three being preferable. The organic group in the organic sulfonic acid may be a hydrocarbon group of different kind (alkyl group or alkylaryl group) having a molecular weight of 300 to 1000. The basic alkaline earth metal salt may be a carbonate or hydroxide of magnesium, calcium, or barium.

In the case where calcium is common to the metal salt of organic sulfonic acid and the basic alkaline earth metal salt, the former is calcium sulfonate and the latter is calcium carbonate and/or calcium hydroxide. In this case the dispersion provides good corrosion resistance, heat resistance, and thixotropic properties. The dispersion is usually composed of 5–55 parts by weight (preferably 15–30 parts by weight) of metal salt of organic sulfonic acid, 1–45 parts by weight (preferably 3–35 parts by weight) of basic alkaline earth metal salt, and 2–80 parts by weight (preferably 30–60 parts by weight) of organic solvent.

According to the present invention, the amount of the basic organic inorganic dispersion should preferably be 10–200 parts by weight for 100 parts by weight of wax (in terms of nonvolatile matter). With an amount less than 10 parts by weight, the undercoating composition will be liable to run (and hence to uneven coating) due to poor thixotropic properties. With an amount in excess of 200 parts by weight, the undercoating composition has difficulty in spray coating because of high viscosity.

The α-olefin oligomer used in the present invention is one which has 6–14 carbon atoms, a molecular weight of 300–2000, and a kinematic viscosity of 5–120 mm²/s at 100° C.

According to the first invention, the amount of the α-olefin oligomer should be 2–50 parts by weight for 100 parts by weight of wax (in terms of nonvolatile matter). With an amount less than 2 parts by weight, the undercoating composition gives a coating film poor in chipping resistance. With an amount in excess of 50 parts by weight, the undercoating composition gives a coating film which softens and runs at high temperatures.

According to the second invention, the amount of the α-olefin oligomer should be 2–30 parts by weight for 100 parts by weight of wax (in terms of nonvolatile matter). With an amount less than 2 parts by weight, the undercoating composition gives a coating film poor in chipping resistance. With an amount in excess of 30 parts by weight, the undercoating composition gives a coating film which softens and runs at high temperatures.

The metal salt of lanolin fatty acid used in the present invention is composed of the metal moiety and the lanolin fatty acid moiety. The former may preferably be an alkaline earth metal (such as calcium and barium), aluminum, and zinc. The latter is obtained by the saponification of lanolin which is followed by solvent extraction and separation into fatty acid moiety and alcohol moiety. The amount of the metal salt of lanolin fatty acid should be 2–50 parts by weight for 100 parts by weight of wax (in terms of nonvolatile matter). With an amount less than 2 parts by weight, the undercoating composition has difficulty in spray coating due to high viscosity and gives a coating film poor in corrosion resistance. With an amount in excess of 50 parts by weight, the undercoating composition gives a coating film poor in chipping resistance.

According to the second invention, the undercoating composition contains an inorganic powder so that it gives a coating which is improved in the secondary run resistance and chipping resistance. In a preferred embodiment of the present invention, this inorganic powder is talc or carbonate or both. The carbonate includes calcium, magnesium, aluminum, and barium carbonates. These carbonates may be used alone or in combination with one another. The amount of the inorganic powder should be 1–30 parts by weight for 100 parts by weight of the entire nonvolatile matter in the undercoating composition. With an amount in excess of 30 parts by weight, the undercoating composition has difficulty in spray coating due to tailing and poor atomization and gives a coating film poor in corrosion resistance. An amount less than 1 part by weight is not enough for the desired effect.

According to a preferred embodiment of the invention, the undercoating composition should contain a proper amount of nonvolatile matter so that it gives a coating film having a density of 1 g/cm³. An excess amount of nonvolatile matter leads to a coating film of high density which adds to the weight of the, automobile. (The coating film should have a low density so as to meet the need of reducing the weight of the automobile.)

The undercoating composition of the present invention may he incorporated, in addition to the above-mentioned essential components, with mineral oil, color pigment, asphalt, UV light absorber, antioxidant, plasticizer, metal salt of petroleum sulfonate, organic solvent, and run preventing agent in adequate amounts, if it is necessary to control the hardness of the coating film, to color the coating film, to prevent the deterioration with time of the coating film, to control the viscosity at the time of application, and to improve the corrosion resistance of the coating film.

The undercoating composition of the present invention may be applied in any manner; however, airless spray coating at a nozzle pressure of 40–120 kgf/cm² is desirable.

As mentioned above, the undercoating composition of the present invention gives a coating film which produces a rust preventing effect over a long period of time because of its superior corrosion resistance. It also gives a coating film having good resistance to chipping and secondary run. Moreover, it permits uniform coating owing to its good application property. Because of these balanced practical properties, it is suitable for automobiles.

Moreover when the coating film has a density lower than 1 g/cm³, it contributes to the weight reduction of automobiles.

DESCRIPTION OF THE PREFERRED EMBODIMENTS

The invention will be described in more detail with reference to the following examples.

(I) COMPOSITIONS OF EXAMPLES

Several undercoating compositions were prepared according to the formulations shown in Tables 1 and 2 (for Examples 1 to 5) and Tables 3 and 4 (for Comparative Examples 1 to 6). Further formulations are expressed in terms of parts by weight unless otherwise specified. In Tables 2 and 4, the amounts of the individual components, respectively, are translated into relative amounts for 100 parts of wax. In Table 4, the relative amount which is outside the scope of the present invention is indicated with an asterisk.

The individual components are explained below. "Microcrystalline wax" is one which has a melting point of 78° C.

"Basic organic inorganic dispersion" is a dispersion of calcium sulfonate and calcium carbonate in mineral spirit. It is a commercial product "CAC1700" (available from Witco Chemical Corp.), containing 50 wt % nonvolatile matter. The organic-inorganic dispersion composition CAC1700 contains about (1) 29 parts by weight calcium sulfonate, (2) 21 parts by weight calcium carbonate and (3) 50 parts by weight mineral spirit.

"α-olefin oligomer" is one which has a molecular weight of 370. The α-olefin oligomer is commercially available under the trade name "PAO 40" which is produced by Chevron Chemical Co. This alpha-olefin has a kinematic viscosity of 3.7 cSt (200° F.) and an average molecular weight of about 370. The α-olefin oligomer PAO 40 contains (1) a highly branched isoparaffinic polyalphaolefin, (2) an oligomer of 1-decene which is a pentamer of ethylene and (3) a compound of the formula I:

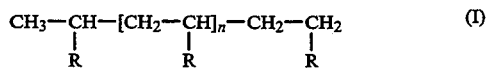

wherein R is $C_mH_{2m+1}$ and m equals 6 to 8.

Representative examples of the alpha-olefin are an oligomer of a tetramer or pentamer of ethylene having a molecular weight between about 370–2200, an oligomer of a copolymer of ethylene and propylene having a molecular weight between about 300–3000 and a polybutene which is produced by copolymerization of a main monomer of isobutylene and another monomer having a copolymer molecular weight between about 300–4000.

TABLE 1

| Components | \multicolumn{5}{c}{Examples} |
|---|---|---|---|---|---|
| | 1 | 2 | 3 | 4 | 5 |
| Mycrocrystralline wax | 28 | 20 | 25 | 23 | 28 |
| Basic organic-inorganic dispersion | 33 | 30 | 16 | 11 | 21 |
| α-olefin oligomer | 7 | 10 | 5 | 5 | 7 |
| Dilute solution of calcium salt of lanolin fatty acid | 14 | 10 | 20 | 14 | 14 |
| Dilute solution of barium petroleum sulfonate | 10 | | 10 | 2 | 5 |
| Dilute solution of barium synthetic sulfonate | | 5 | 5 | | |
| straight asphalt | | 12 | | | |
| talc | | | | 14 | 11 |
| calcium carbonate | | | 5 | | |
| Mineral oil | | | 2 | 12 | |
| 2-(5-methyl-2-hydroxyphenyl) benzotriazole | 0.5 | | | | 0.5 |
| derivatives of 2,2,4-trimethyl-1,2-dihydroquinoline | | 0.5 | | | |
| Antisagging agent | | 2 | | | |
| Carbon black dispersion | 1 | 2 | | 1 | 1 |
| Mineral spirit | 6.5 | 8.5 | 12 | 17 | 12.5 |
| Total | 100 | 100 | 100 | 100 | 100 |

TABLE 2

| Components | \multicolumn{5}{c}{Examples} |
|---|---|---|---|---|---|
| | 1 | 2 | 3 | 4 | 5 |
| relative amounts of each of components for 100 parts of wax | | | | | |
| sulfonate of superbasic alkaline earth metal | 59 | 75 | 32 | 28 | 38 |
| α-olefin oligomer | 25 | 33 | 25 | 22 | 25 |
| metal salt of lanolin fatty acid | 25 | 25 | 40 | 31 | 25 |
| relative amounts of inorganic powder for 100 parts of total nonvolatile matter of composition | 0 | 0 | 8 | 21 | 16 |

TABLE 3

| Components | \multicolumn{6}{c}{Comparative Examples} |
|---|---|---|---|---|---|---|
| | 1 | 2 | 3 | 4 | 5 | 6 |
| Mycrocrystralline wax | 23 | 10 | 25 | 10 | 20 | 20 |
| Basic organic-inorganic dispersion | | | | 42 | 20 | 20 |
| α-olefin oligomer | | | 10 | 5 | 12 | 10 |
| Dilute solution of calcium salt of lanolin fatty acid | | 20 | 20 | 10 | 10 | 24 |
| Dilute solution of barium petroleum sulfonate | 5 | | 10 | 10 | 10 | |
| Dilute solution of barium synthetic sulfonate | | 10 | | | | 10 |
| straight asphalt | | 15 | | 9 | | |
| talc | 40 | | 10 | 10 | 10 | 10 |
| calcium carbonate | | 22 | | | | |
| Mineral oil | 10 | | | | 2 | |
| 2-(5-methyl-2-hydroxyphenyl)benzotriazole | | | | 0.5 | | |
| Antisagging agent | | 2 | | | | |
| Carbon black dispersion | 2 | 1 | 1 | 1 | 1 | 1 |
| Mineral spirit | 20 | 20 | 24 | 2.5 | 15 | 5 |
| Total | 100 | 100 | 100 | 100 | 100 | 100 |

TABLE 4

| Components | \multicolumn{6}{c}{Examples} |
|---|---|---|---|---|---|---|
| | 1 | 2 | 3 | 4 | 5 | 6 |
| relative amounts of each of components for 100 parts of wax | | | | | | |
| sulfonate of superbasic alkaline earth metal | *— | *— | *— | *210 | 50 | 50 |
| α-olefin oligomer | *— | *— | 40 | *50 | *60 | *50 |
| metal salt of lanolin fatty acid | *— | *100 | 40 | 50 | 25 | *60 |
| relative amounts of inorganic powder for 100 parts of total nonvolatile matter of composition | *50 | *32 | 15 | 14 | 14 | 11 |

"Dilute solution of calcium salt of lanolin fatty acid" is a solution containing 50 wt % nonvolatile matter, diluted with mineral spirit.

"Dilute solution of barium petroleum sulfonate" is a solution containing 50 wt % active ingredient, diluted with mineral oil. "Dilute solution of barium synthetic sulfonate" is a solution containing 50 wt % active ingredient, diluted with mineral oil.

"Mineral oil" is one which has a kinematic viscosity of 260 mm²/s at 40° C. and a pour point lower than −15° C.

"Antisagging agent" is one which contains 25 wt % polyethylene oxide (nonvolatile matter) in mineral spirit.

"Carbon black dispersion" is a dispersion containing 20 wt % carbon black in process oil.

(II) TEST FOR PERFORMANCE

The undercoating compositions specified in Tables 1 and 3 were tested for performance as follows:

(1) Viscosity

Measured at 20° C. using a Brookfield viscometer, with the rotor (No. 6) rotating at 20 rpm.

(2) Nonvolatile matter

Measured according to the method specified by JIS K5400, Section 8.2.

(3) Density of coating film

Calculated from the amount of solids in the composition measured according to JIS K2249, Section 4.6.

(4) Corrosion resistance

Evaluated by salt spray testing (according to JIS K2246) on a test piece prepared by coating a steel sheet SPCC-SD (150×70×0.8 mm) with each composition in a dry thickness of 100 μm. After drying at normal temperature for 24 hours, the test piece was placed in the salt spray chamber for 20 days, with the coating film scored diagonally to a depth reaching the substrate. And the rust width after the test was measured.

(5) Chipping resistance

Evaluated using a stone shooting machine (Model JA-100, made by Suga Shikenki Co., Ltd. ) for a test piece prepared by spray coating an electrocoated steel sheet (150×70×0.8 mm) with each composition in a dry thickness of 600 μm. After drying at normal temperature for 72 hours and cooling thermostat chamber at −30° C., the test piece was struck once with 500 g of crushed stones No. 6 (which is provided by JIS) shot under a pressure of 5 kgf/cm². The area of the coating film which had peeled off was measured.

(6) Application property

Evaluated by observing the atomization which takes place when the composition sample is sprayed using an airless spray coating machine (bulldog type, pressure ratio=30:1, made by Nippon Gray Co., Ltd.) equipped with a nozzle tip 163-417 (orifice 0.43 mm) at a discharge pressure of 50 kgf/cm².

(7) Resistance to secondary run

A test piece was prepared by spray coating an electrocoated steel sheet (150×70×0.8 mm) (with its lower half, 75 mm, masked) with each composition sample in a dry thickness of 600 μm. After drying at normal temperature for 72 hours, the test piece was heated in vertical position at 100° C. for 30 minutes, and the length of the coating film which had run was measured.

(III) RESULT OF TEST

The result of the tests are shown in Table 5, in which the ratings are given according to the following criteria.
"Corrosion resistance"
○ ... rust width smaller than 0.5 mm
Δ ... rust width from 0.5 to 1.5 mm
× ... rust width greater than 1.5 mm
"Chipping resistance"
○ ... less than 10%
Δ ... from 10 to 30%
× ... more than 30%
"Application property"
○ ... good
Δ ... slight tailing
× ... severe tailing
"Resistance to secondary run"
○ ... no run
Δ ... run shorter than 10 mm
× ... run not shorter than 10 mm The results shown in Table 5 indicate the following.

The composition in Comparative Example 1, which does not contain the basic organic-inorganic dispersion, olefin oligomer, and metal salt of lanolin fatty acid but contains a large amount (50 parts) of inorganic powder, is poor in corrosion resistance and application property because of incomplete atomization.

The composition in Comparative Example 2, which does not contain the basic organic inorganic dispersion and olefin oligomer but contains a comparatively large amount (32 parts) of inorganic powder, is also poor in corrosion resistance.

The composition in Comparative Example 3, which does not contain the basic organic inorganic dispersion but contains a large amount (40 parts) of olefin oligomer and calcium carbonate as an inorganic powder, is poor in resistance to secondary run.

The composition in Comparative Example 4, which contains the basic organic inorganic dispersion in a large amount (210 parts), is poor in application property because of high viscosity despite the small amount of inorganic powder. Incidentally, in this case the composition tends to decrease in chipping resistance because it contains the metal salt of lanolin fatty acid in a comparatively large amount (50 parts). In the case where the content of metal salt of lanolin fatty acid is as high as 60 parts (as in Comparative Example 6), the composition is poor in chipping resistance. In the case where the content of olefin oligomer is as high as 60 parts (as in Comparative Example 5), the composition is poor in resistance to secondary run.

The compositions in Examples 1 to 5, which are within the scope of the invention, are superior in every respect and exhibit the well-balanced practical performance. They have a viscosity from 12000 to 18000, which is suitable for spray coating. In addition, they form a coating film having a density lower than 1 g/cm³, which is required for the weight reduction of automobiles.

What is claimed is:

1. An undercoating composition which comprises (a) 100 parts by weight of a wax, (b) 10–200 parts by weight of a basic organic-inorganic dispersion comprising a metal salt of an organic sulfonic acid, a basic alkaline earth metal salt, and an organic solvent, (c) 2–50 parts by weight of an α-olefin oligomer, and (d) 2–50 parts by weight of a metal salt of a lanolin fatty acid,
wherein the total amount of organic solvents in the undercoating agent composition is from 33 to 44 parts by weight based on 100 parts by weight of the undercoating agent composition and wherein the viscosity of the undercoating agent composition is from 12,000 to 18,000 mPa s.

2. An undercoating composition as defined in claim 1, wherein the metal for the organic sulfonate is sodium, potassium, magnesium, calcium, or barium, the organic group in the organic sulfonic acid is a hydrocarbon group having a molecular weight of 300 to 1000, and the basic alkaline earth metal salt is a carbonate or a hydroxide of magnesium, calcium, or barium.

3. An undercoating composition as defined in claims 1 or 2, wherein the density of the total nonvolatile matter in the composition is not more than 1 g/cm³.

4. An undercoating composition as defined in claims 1 or 2, wherein, the amount of the basic organic-inorganic dispersion is 10–200 parts by weight for 100 parts by weight of wax in terms of nonvolatile matter 5. An undercoating composition as defined in claim 4, wherein the density of the total nonvolatile matter in the composition is not more than 1 g/cm³.

6. An undercoating composition as defined in claim 1, wherein the metal for the organic sulfonate is sodium, potassium, magnesium, calcium, or barium, the organic group in the organic sulfonic acid is a hydrocarbon group having a molecular weight of 300 to 1000, and the basic alkaline earth metal salt is a carbonate or hydroxide a of magnesium, calcium, or barium.

TABLE 5

| Tested properties | Examples | | | | | Comparative Examples | | | | | |
|---|---|---|---|---|---|---|---|---|---|---|---|
| | 1 | 2 | 3 | 4 | 5 | 1 | 2 | 3 | 4 | 5 | 6 |
| Viscosity (mPa · s) | 16000 | 12000 | 18000 | 15500 | 15000 | 10000 | 12000 | 15000 | 50000 | 90000 | 60000 |
| Nonvolatile matter (wt %) | 70 | 70 | 70 | 70 | 70 | 80 | 68.5 | 66 | 71.5 | 70 | 73 |
| Density of coating film (g/cm³) | 0.95 | 0.94 | 0.96 | 1.00 | 0.98 | 1.30 | 1.28 | 0.98 | 0.98 | 0.98 | 0.98 |
| Corrosion resistance | ○ | ○ | ○ | ○ | ○ | Δ | × | ○ | ○ | ○ | ○ |
| Chipping resistance | ○ | ○ | ○ | ○ | ○ | ○ | ○ | ○ | Δ | ○ | × |
| Application property | ○ | ○ | ○ | ○ | ○ | × | ○ | ○ | × | ○ | ○ |
| Resistance to secondary run | ○ | ○ | ○ | ○ | ○ | ○ | ○ | × | ○ | × | ○ |

7. An undercoating composition which comprises (a) 100 parts by weight of a wax, (b) 10-200 parts by weight of a basic organic-inorganic dispersion composed of a metal salt of an organic sulfonic acid, a basic alkaline earth metal salt, and an organic solvent, (c) 2-30 parts by weight of an α-olefin oligomer, (c) 2-50 parts by weight of a metal salt of a lanolin fatty acid, and (e) 1-30 parts by weight of an inorganic powder for 100 parts by weight of the total nonvolatile matter of the composition, wherein the total amount of organic solvents in the undercoating agent composition is from 33 to 44 parts by weight based on 100 parts by weight of the undercoating agent composition and wherein the viscosity of the undercoating agent composition is from 12,000 to 18,000 mPa s.

8. An undercoating composition as defined in claims 6 or 7, wherein the density of the total nonvolatile matter in the composition is not more than 1 g/cm$^3$.

9. An undercoating composition as defined in claims 6 or 7, wherein, the amount of the basic organic-inorganic dispersion is 10-200 parts by weight for 100 parts by weight of wax in terms of nonvolatile matter.

10. An undercoating composition as defined in claim 7, wherein the inorganic powder is talc or carbonate or both.

11. An undercoating composition as defined in any of claim 10, wherein the density of the total nonvolatile matter the composition is not more than 1 g/cm$^3$.

* * * * *

UNITED STATES PATENT AND TRADEMARK OFFICE
CERTIFICATE OF CORRECTION

PATENT NO. : 5,354,372
DATED : October 11, 1994
INVENTOR(S) : S. Ebayashi et al

It is certified that error appears in the above-indentified patent and that said Letters Patent is hereby corrected as shown below:

Claim 11, column 10, line 13, delete "any of" and
                 line 15, after "matter" insert --in --.

Signed and Sealed this

Twenty-fifth Day of April, 1995

Attest:

BRUCE LEHMAN

Attesting Officer     Commissioner of Patents and Trademarks